(12) United States Patent
Diamond et al.

(10) Patent No.: US 12,351,196 B2
(45) Date of Patent: Jul. 8, 2025

(54) REAL-TIME DIGITAL MODELING

(71) Applicant: Ford Global Technologies, LLC, Dearborn, MI (US)

(72) Inventors: Brendan Francis Diamond, Grosse Pointe, MI (US); Rajib Kumar Saha, Lasalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 18/193,829

(22) Filed: Mar. 31, 2023

(65) Prior Publication Data
US 2024/0326840 A1    Oct. 3, 2024

(51) Int. Cl.
| | |
|---|---|
| *B60W 50/02* | (2012.01) |
| *B60W 10/06* | (2006.01) |
| *B60W 10/08* | (2006.01) |
| *B60W 10/18* | (2012.01) |
| *B60W 10/20* | (2006.01) |
| *B60W 50/14* | (2020.01) |
| *G05B 17/02* | (2006.01) |

(52) U.S. Cl.
CPC ........ *B60W 50/0225* (2013.01); *B60W 10/06* (2013.01); *B60W 10/08* (2013.01); *B60W 10/18* (2013.01); *B60W 10/20* (2013.01); *B60W 50/0205* (2013.01); *B60W 50/14* (2013.01); *G05B 17/02* (2013.01); *B60W 2050/0215* (2013.01); *B60W 2050/146* (2013.01); *B60W 2555/20* (2020.02); *B60W 2556/50* (2020.02)

(58) Field of Classification Search
CPC .. B60W 50/0225; B60W 10/06; B60W 10/08; B60W 10/18; B60W 10/20; B60W 50/0205; B60W 50/14; B60W 2050/0215; B60W 2050/146; B60W 2555/20; B60W 2556/50; G05B 17/02; G06F 30/15; G06F 30/20
See application file for complete search history.

(56) References Cited

U.S. PATENT DOCUMENTS

| | | | |
|---|---|---|---|
| 7,023,332 B2 | 4/2006 | Saito et al. | |
| 7,133,756 B2 | 11/2006 | Jammu et al. | |
| 10,719,886 B1 | 7/2020 | Konrardy et al. | |
| 11,332,173 B2 | 5/2022 | Howard et al. | |
| 11,954,651 B2 * | 4/2024 | Shiraishi | G07C 5/0841 |
| 2019/0333291 A1 | 10/2019 | Liu et al. | |

FOREIGN PATENT DOCUMENTS

| | | | | |
|---|---|---|---|---|
| CN | 110488629 B | * | 10/2019 | ............ G05B 17/02 |
| CN | 110488629 A | | 11/2019 | |

* cited by examiner

*Primary Examiner* — Brian P Sweeney
(74) *Attorney, Agent, or Firm* — Christopher Storms; Brooks Kushman P.C.

(57) ABSTRACT

A first computer includes a processor coupled to a memory, the memory including first instructions executable by the processor to transmit a message, responsive to receipt of an indicator from the first sensor of a first system, to an input of a digital model of the first system. The message can include data describing the indicator and data describing an operational and/or a physical environment of the first system. The first instructions can additionally include instructions to receive, responsive to the digital model executing programming of the first system, in which the second instructions are to modify an operation of the first system based on the described operational and/or physical environments.

20 Claims, 5 Drawing Sheets

REAL-TIME DIGITAL MODELING

BACKGROUND

A system, such as a vehicle, can be equipped with various sensors that provide monitoring and/or controlling of operational aspects of the system. However, at times, a sensor or other system component may experience a degradation in performance. Responsive to detection of the degradation in the performance of a sensor or other system component, a system may adjust its operation so as to operate in a derated mode so that the system can continue to provide some level of functionality until a sensor exhibiting degraded performance or other system component can be repaired and/or replaced.

DETAILED DESCRIPTION

Introduction

Figure 1:
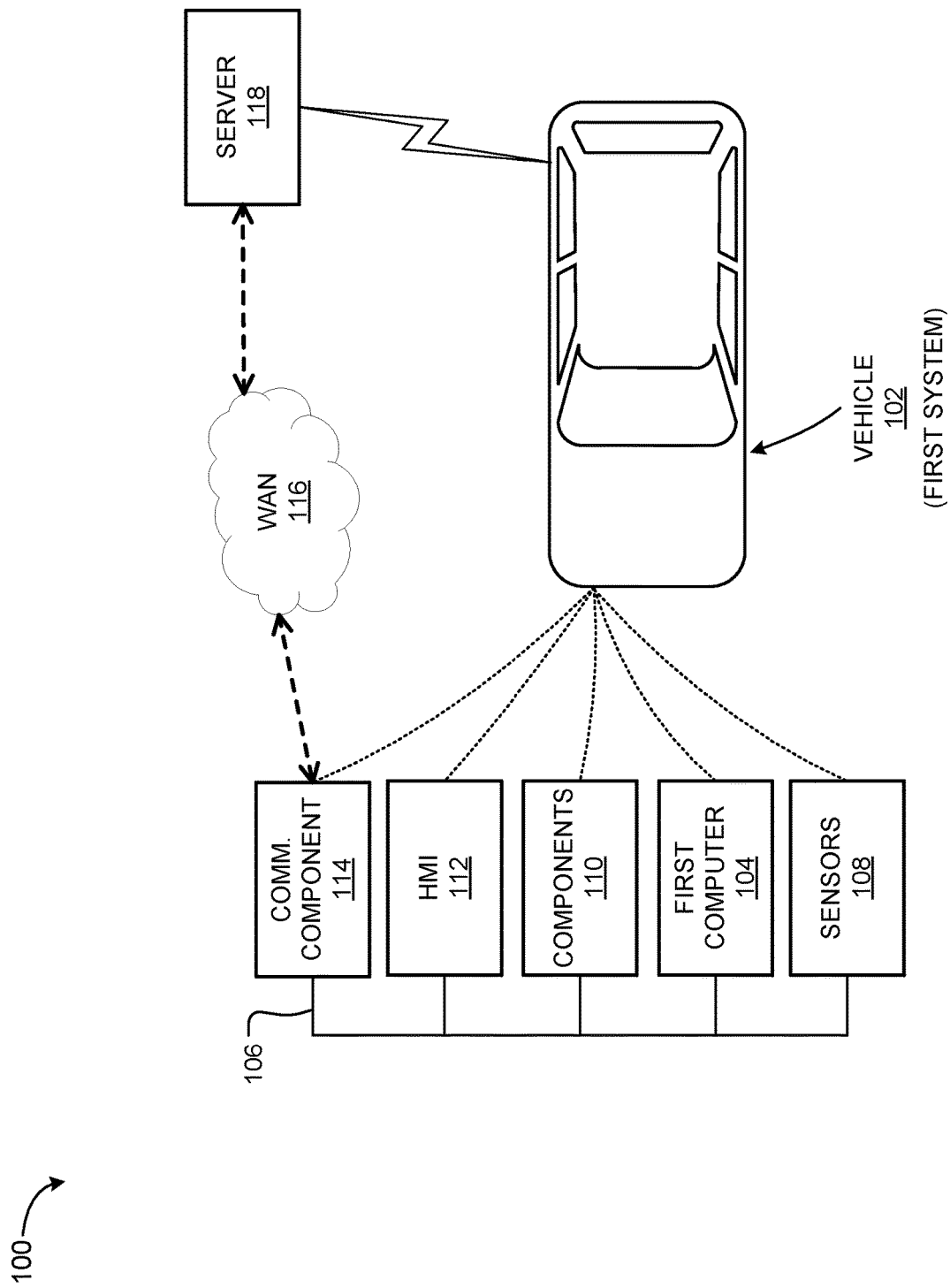
FIG. 1 is a block diagram of an example vehicle.

This disclosure provides techniques for real-time digital modeling of a system, such as a vehicle, in which a computer controls certain performance aspects of the system in response to receiving sensor inputs. In example applications, a server or other type of computer operates at a remote location to implement a digital model of the system. The digital model includes a computer and a sensor environment that emulates the sensor environment of the system. In an example, the digital model simulates, or even replicates, the operational environment of the system utilizing programming steps that are similar to, or even identical to, the programming steps executed by a computer of the system. The digital model can additionally include an emulator that characterizes actions performed by the sensors of the system, so as to provide a realistic representation of the system operating in an actual, physical environment. Further, in response to detection of a degradation in the performance of a sensor, the digital model can obtain state information, which can characterize the operation and/or physical environment of the system. Accordingly, in the event of a degradation in the performance of a sensor of the system, the digital model can simulate effects of the degraded sensor in a digital domain and determine a manner by which system operation can continue in the actual operational and/or physical environment.

In this context, a "digital model" is a computer-implemented representation of an actual system (i.e., including physical components and operating in the physical world) in a digital or virtual domain. Thus, for example, a digital model of a vehicle can be implemented by a computer that executes programming steps that are similar to, or in some instances even line-by-line identical to, the programming steps executed by a computer operating in the vehicle. In addition, the digital model can include a sensor emulator that transmits similar, or even identical, data transmitted by a counterpart sensor operating in a physical domain. Accordingly, a digital model can perform tasks in a digital or virtual domain identical to those performed in the actual operational and/or physical environment of the system. Further, via emulation of sensor data outputs and execution of programming steps similar, or in some instances even line-by-line identical to, programming steps executed by an actual computer of the system, the digital model can behave in a manner that tracks behavior of the system operating in the physical domain. Such behaviors can include modeling of signal timing parameters, control system slew rates, waveforms of input data from sensors, interactions between programming steps and hardware and/or firmware resources accessible to a computer of the system, etc.

Accordingly, examples of a digital model described herein are distinguished from existing state-of-the-art models, which may utilize system and/or component models implemented using programming steps, signal waveforms, etc., that differ significantly from those of a counterpart system operating in a real-world environment. In some instances, rather than employ actual programming steps implemented in a system that operates in a real-world environment, existing state-of-the-art models may utilize simulated components that include idealized models of system components. Thus, performance of such models can be uncorrelated with the performance of a system operating in an actual environment.

Also in this context, the term "operational environment" means as conditions within which the system operates, i.e., for a physical system an operational environment includes a physical environment. Thus, for example, for a vehicle system that includes propulsion, braking, steering, infotainment, navigation, climate control, etc., an operational environment can include vehicle speed settings, vehicle towing parameters, vehicle braking parameters, engine torque output, engine and transmission temperatures, battery temperatures, vehicle steering parameters, etc. Also in this context, the term "physical environment" means the ambient conditions outside of the system. Thus, for example, a physical environment of a system can include outside air temperature, humidity, and weather conditions (e.g., rain, snow, etc.), parameters related to the incline or gradient of a road or other type of path on which the vehicle is proceeding, surface roughness of a road, etc.

Advantageously, in response to a computer of the system, such as a computer operating within a vehicle, detecting a degradation in performance of a vehicle sensor, e.g., intermittent communication, low signal levels, output signals exhibiting beyond a threshold level of noise, an increase in bit-error-rate of output signals, output signals that appear inconsistent with other, perhaps complementary, sensor measurements, etc., the vehicle can transmit an indicator that describes the degraded performance mode of the sensor to a server that implements a digital model of the vehicle. The vehicle can further transmit parameters characterizing a current state of the vehicle, which can include the vehicle's operational and/or physical environment. In response, the server implementing the digital model can simulate, with relatively high fidelity, the operating parameters of the vehicle and can determine appropriate modifications to vehicle operations to compensate for the degradation in sensor performance so that the vehicle can continue operating. In some examples, compensation for the degradation in sensor performance can include the digital model derating vehicle operation, in which the vehicle is instructed to operate in a manner that reduces demand on aspects of vehicle operation. Derating of vehicle operation can include, for example, instructing the vehicle to operate at a decreased speed, to proceed along a path to a destination that includes travel over relatively flat terrain, rather than via inclined roads through mountainous terrain, etc. In other examples, compensation for the degradation in sensor performance can include the digital model instructing the substitution of an input signal from the sensor exhibiting degraded performance with an input signal from a different sensor. In other examples, compensation for the degradation in sensor performance can include the digital model instructing the remapping of input/output ports of a vehicle computer, so as to preclude a system component from utilizing data from the sensor exhibiting degraded performance. In other examples, responsive to a degradation in the capability for a sensor to communicate via a wired medium, a digital model can instruct a sensor to communicate via a wireless channel.

In an example, an apparatus can include a first computer including a processor coupled to a memory, the memory including first instructions executable by the processor to transmit a message, responsive to receipt of an indicator from a first sensor of a first system, to an input of a digital model of the first system, the message can include data describing the indicator and data describing an operational environment and a physical environment of the first system. The instructions executable by the processor can additionally be to receive, responsive to the digital model executing programming of the first system, second instructions to modify an operation of the first system based on the described operational and physical environments.

The first system can include a system of a vehicle. The second instructions to modify the operation of the first system can further include instructions to actuate propulsion of the vehicle, actuate braking of the vehicle, actuate steering of the vehicle, and/or to actuate a display to display potential modifications to the operational or physical environment of the first system.

The first system can include a system of a vehicle, and the first instructions can further include instructions to transmit a planned route of the vehicle and to receive, in response to receipt of the planned route by the digital model, a re-planned route of the vehicle for travel in a different physical environment.

The indicator from the first sensor can indicate degraded performance of the first sensor.

The indicator from the first sensor can indicate degraded performance of the first sensor and the second instructions to modify the operation of the first system can include instructions to substitute an input signal from the first sensor by a second sensor.

The indicator from the first sensor can indicate degraded performance of the first sensor and the second instructions to modify the operation of the first system can include instructions to substitute an input signal from the first sensor by a second sensor, the second sensor having decreased accuracy with respect to the first sensor.

The indicator from the first sensor can indicate a degraded communications capability of the first sensor. The second instructions to modify the operation of the first system can include instructions for the first system to communicate with the first sensor via a wireless channel.

The indicator from the first sensor can indicate a degraded communications capability of the first sensor. The second instructions to modify the operation of the first system can include instructions to reconfigure a dataflow map of the first computer of the first system.

The from the first sensor can indicate a degraded communications capability of the first sensor. The second instructions to modify the operation of the system can include instructions to perform a function via a second computer of the first system.

The first system can include a vehicle system, in which the described operational environment can include an energy storage component, a propulsion component, a braking component, a suspension component, a steering component, or a transmission component.

In another example, an apparatus can include a computer including a processor coupled to a memory, the memory including first instructions executable by the processor to receive a message, responsive to receipt of an indicator from a first sensor of a first system, for input to a first digital model of the first system, the message including data describing the indicator and data describing an operational environment and a physical environment of the first system. The first instructions executable by the processor can additionally apply the indicator from the first sensor to a digital model executing programming of the first system and transmit second instructions to actuate a change in an operation of the first system based on the described operational and physical environments.

The first instructions can further include instructions to apply the described operational and physical environments to the digital model of the first system. The second instructions can include instructions to operate the first system in a derated mode.

The first instructions can further include instructions to apply a second digital model of the first system responsive to determination that the described physical environment meets a threshold condition of inclement weather.

The first system can include a system of a vehicle, and the second instructions can further include instructions to receive a planned route of the vehicle and to transmit a re-planned route of the vehicle for travel in a different physical environment.

The indicator from the first sensor can indicate degraded performance of the first sensor and the second instructions to modify operation of the first system can include instructions to substitute an input signal from the first sensor by a second sensor.

The indicator from the first sensor can indicate degraded performance of the first sensor and the second instructions to modify the operation of the first system can include instructions to substitute an input signal from the first sensor by a second sensor, in which the second sensor has decreased accuracy with respect to the first sensor.

The indicator from the first sensor can indicate a degraded communications capability of the first sensor and the second instructions to modify the operation of the system can include instructions for the system to communicate with the first sensor via a wireless channel.

The indicator from the first sensor can indicate a degraded communications capability of the first sensor, and the second instructions to modify the operation of the system can include instructions to reconfigure a dataflow map of data from the first sensor to the system.

The indicator from the first sensor can indicate a degraded communications capability of the first sensor, and the second instructions to modify the operation of the system can include instructions to perform a function utilizing a second computer of the system.

The system can include a vehicle system, in which the described operational environment can include an energy storage component, a propulsion component, a braking component, a suspension component, a steering component, or a transmission component.

In an example, an operational environment of a vehicle system can include state information related to numerous systems within a vehicle. Such systems can include an "energy storage component," which, as used herein, means a portion of a chemical or charge storage system and any instrumentation and/or monitoring components. Thus, an energy storage component can include a fuel tank, a fuel pump, a fuel quantity and/or fuel flow rate sensor, a battery, a fuel cell, an inverter to convert a direct current to an alternating current, a battery temperature sensor, a fuse or circuit breaker, etc. An operational environment of a vehicle system can also include state information relative to a "propulsion component," which means a component related to generating torque capable of moving the vehicle along a roadway as well as any instrumentation and/or monitoring components. Thus, a propulsion component can include an internal combustion engine (e.g., a gasoline engine, a diesel engine, an engine utilizing liquefied natural gas), an electric motor utilized in an electric or electrified vehicle, as well as an engine temperature sensor, an electric motor temperature sensor, a current sensor, an electric motor overcurrent sensor, etc. An operational environment of a vehicle system can also include state information relative to a "braking component," which, means a component related to slowing and/or stopping a vehicle, such as a brake disc or brake drum, a brake disc wear sensor, a brake caliper, a brake fluid level sensor, a brake pressure sensor, a brake pump, a component of a hydraulic braking system, etc. An operational environment of a vehicle system can also include state information relative to a "suspension component," which means a component related to supporting the vehicle at all times. Such components may include shock absorbers, dampers, etc. An operational environment of a vehicle system can also include state information relative to a "steering component," which means a component of a steering linkage, a steering damper, a control arm, a bushing, an electronic steering control unit, etc. An operational environment of a vehicle can also include state information relative to a "transmission component," which means a gearbox that operates to couple torque generated by an internal combustion engine or electric motor to the wheels of the vehicle. Thus, a transmission component can include any component related to an automatic transmission, a driveshaft, a differential, a gearbox utilized in four-wheel-drive vehicles, etc.

As shown in FIG. 1, a system 100 includes a vehicle 102, that includes first computer 104 that is communicatively coupled, via vehicle network 106, with various elements including sensors 108, subsystems or components 110, such as steering, propulsion, braking, human machine interface (HMI) 112, and communication component 114. First computer 104, and server 118 discussed below, include a processor and a memory. A memory of first computer 104, such as those described herein, includes one or more forms of non-transitory media readable by first computer 104, and can store first instructions executable by first computer 104 for performing various operations, such that the vehicle computer is configured to perform the various operations, including those disclosed herein.

For example, first computer 104 can include a generic computer with a processor and memory as described above and/or may comprise an electronic control unit (ECU) or a controller for a specific function or set of functions, and/or a dedicated electronic circuit including an ASIC (application specific integrated circuit) that is manufactured for a particular operation, (e.g., an ASIC for processing data from sensors and/or communicating data from sensors 108). In another example, first computer 104 may include an FPGA (Field-Programmable Gate Array), which is an integrated circuit manufactured to be configurable by a user. In example embodiments, a hardware description language such as VHDL (Very High Speed Integrated Circuit Hardware Description Language) may be used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected or coupled to the FPGA circuit.) In some examples, a combination of processor(s), ASIC(s), and/or FPGA circuits may be included in first computer 104. Further, first computer 104 may include a plurality of computers in the vehicle (e.g., a plurality of ECUs or the like) operating together to perform operations ascribed herein to the first computer 104.

The memory of first computer 104 can be of any type, such as hard disk drives, solid state drives, or any volatile or non-volatile media. The memory can store the collected data transmitted by sensors 108. The memory can be a separate device from first computer 104, and first computer 104 can retrieve information stored by the memory via a communication network in the vehicle such as vehicle network 106, e.g., over a controller area network (CAN) bus, a local interconnect network (LIN) bus, a wireless network, etc. Alternatively or additionally, the memory can be part of first computer 104, for example, as a memory internal to first computer 104.

First computer 104 can include or access first instructions to operate one or more components 110 such as vehicle brakes, propulsion (e.g., one or more of an internal combustion engine, electric motor, hybrid engine, etc.), steering, climate control, interior and/or exterior lights, infotainment, navigation etc., as well as to determine whether and when first computer 104, as opposed to a human operator, is to control such operations. Additionally, first computer 104 can be programmed to determine whether and when a human operator is to control such operations. First computer 104 can include or be communicatively coupled, e.g., via vehicle network 106, to more than one processor, which can be included in components 110 such as sensors 108, electronic control units (ECUs) or the like included in the vehicle for monitoring and/or controlling various vehicle components, e.g., a powertrain controller, a brake controller, a steering controller, etc.

First computer 104 may be generally arranged for communications on vehicle network 106 that can include a communications bus in the vehicle, such as a controller area network CAN or the like, and/or other wired and/or wireless mechanisms. Vehicle network 106 corresponds to a communications network, which can facilitate exchange of messages between various onboard vehicle devices, e.g., sensors 108, components 110, first computer 104 and a computer onboard vehicle 102. First computer 104 can be generally programmed to send and/or receive, via vehicle network 106, messages to and/or from other devices in vehicle, e.g., any or all of ECUs, sensors 108, actuators, components 110, communications module, human machine interface (HMI) 112. For example, various component 110 subsystems (e.g., components 110 can be controlled by respective ECUs).

Further, in implementations in which first computer 104 actually comprises a plurality of devices, vehicle network 106 may be used for communications between devices represented as first computer 104 in this disclosure. For example, vehicle network 106 can provide a communications capability via a wired bus, such as a CAN bus, a LIN bus, or can utilize any type of wireless communications capability. Vehicle network 106 can include a network in which messages are conveyed using any other wired communication technologies and/or wireless communication technologies, e.g., Ethernet, Wi-Fi®, Bluetooth®, etc. Additional examples of protocols that may be used for communications over vehicle network 106 in some implementations include, without limitation, Media Oriented System Transport (MOST), Time-Triggered Protocol (TTP), and FlexRay. In some implementations, vehicle network 106 can represent a combination of multiple networks, possibly of different types, that support communications among devices onboard a vehicle. For example, vehicle network 106 can include a CAN bus, in which some in-vehicle sensors and/or components communicate via a CAN bus, and a wired or wireless local area network in which some device in vehicle communicate according to Ethernet, Wi-Fi®, and/or Bluetooth communication protocols.

Vehicle 102 typically includes a variety of sensors 108. Sensors 108 can include a suite of devices that can obtain one or more measurements of one or more physical phenomena. Some of sensors 108 detect variables that characterize the operational environment of the vehicle, e.g., vehicle speed settings, vehicle towing parameters, vehicle braking parameters, engine torque output, engine and transmission temperatures, battery temperatures, vehicle steering parameters, etc. Some of sensors 108 detect variables that characterize the physical environment of vehicle 102, such as outside air temperature, humidity, weather conditions (e.g., rain, snow, etc.), parameters related to the inclination or gradient of a road or other type of path on which the vehicle is proceeding, a particular ambient temperature, surface roughness of a road (e.g., on road versus off-road travel), etc. In example embodiments, sensors 108 can operate to detect the position or orientation of the vehicle utilizing, for example, signals from a satellite positioning system (e.g., global positioning system or GPS); accelerometers, such as piezo-electric or microelectromechanical systems MEMS; gyroscopes such as rate, ring laser, or fiber-optic gyroscopes; inertial measurement units IMU; and magnetometers. In example embodiments, sensors 108 can include sensors to detect aspects of the environment external to vehicle 102, such as radar sensors, scanning laser range finders, cameras, etc. Sensors 108 can also include light detection and ranging (LIDAR) sensors, which operate to detect distances to objects by emitting a laser pulse and measuring the time of flight for the pulse to travel to the object and back. Sensors 108 may include a controller and/or a microprocessor, which execute instructions to perform, for example, analog-to-digital conversion to convert sensed analog measurements and/or observations to input signals that can be provided to first computer 104, e.g., via vehicle network 106.

First computer 104 can be configured for utilizing vehicle-to-vehicle (V2V) communications via communication component 114 and/or may interface with devices outside of the vehicle, e.g., through wide area network (WAN) 116 via V2V communications. First computer 104 can communicate outside of vehicle 102, such as via vehicle-to-infrastructure (V2I) communications, vehicle-to-everything (V2X) communications, or V2X including cellular communications C-V2X, and/or wireless communications cellular dedicated short range communications DSRC, etc. Communications outside of vehicle 102 can be facilitated by direct radio frequency communications and/or via network server 118. Communications component 114 can include one or more mechanisms by which first computer 104 communicates with vehicles outside of vehicle 102, including any desired combination of wireless, e.g., cellular, wireless, satellite, microwave, radio frequency communication mechanisms and any desired network topology or topologies when a plurality of communication mechanisms are utilized.

Vehicle 102 can include HMI 112 (human-machine interface), e.g., one or more of an infotainment display, a touchscreen display, a microphone, a speaker, etc. A user, such as the operator of vehicle 102, can provide input to devices such as first computer 104 via HMI 112. HMI 112 can communicate with first computer 104 via vehicle network 106, e.g., HMI 112 can send a message including the user input provided via a touchscreen, microphone, a camera that captures a gesture, etc., to first computer 104, and/or can display output, e.g., via a display, speaker, etc. Further, operations of HMI 112 can be performed by a portable user device (not shown) such as a smart phone or the like in communication with first computer 104, e.g., via Bluetooth or the like.

WAN 116 can include one or more mechanisms by which first computer 104 may communicate with server 118. Server 118 can include an apparatus having one or more computing devices, e.g., having respective processors and memories and/or associated data stores, which may be accessible via WAN 116. In example embodiments, vehicle 102 could include a wireless transceiver (i.e., transmitter and/or receiver) to send and receive messages outside of vehicle 102. Accordingly, the network can include one or more of various wired or wireless communication mechanisms, including any desired combination of wired e.g., cable and fiber and/or wireless, e.g., cellular, wireless, satellite, microwave, and radio frequency communication mechanisms and any desired network topology or topologies when multiple communication mechanisms are utilized. Exemplary communication networks include wireless communication networks, e.g., using Bluetooth, Bluetooth Low Energy BLE, IEEE 802.11, V2V or V2X such as cellular V2X CV2X, DSRC, etc., local area networks and/or wide area networks 116, including the Internet.

In an example implementation, first computer 104 detects a degradation in performance of one or more of sensors 108. A degradation in sensor performance can be detected, for example, by first computer 104 detecting a delay in receiving an input signal from one or more of sensors 108. Alternatively, first computer 104 detects an increase in a bit-error-rate of input signals or other indicator of degraded signal quality from one of sensors 108. In response to detecting degradation in the performance the sensor, vehicle 102 can transmit a message that includes an indicator describing the degradation in sensor performance to server 118. Vehicle 102 can additionally transmit data describing an operational environment and/or a physical environment of vehicle 102. In turn, server 118 can convey the received indicator of sensor degradation and the received data describing the operational and/or physical environment of vehicle 102 to a digital model, e.g., digital model 202 of FIG. 2, executing on server 118. The digital model can then utilize the received indicator of sensor degradation and the data describing the operational and/or physical environment of vehicle 102 as initial conditions of the digital model to simulate, with relatively high fidelity, the state of vehicle 102 so that the digital model can provide an appropriate instructions to compensate for the detected degradation in the performance the sensor. The digital model executing on server 118 can utilize programming instructions that are similar to, or even identical to, programming instructions executed on each of individual sensors 108. Further, the digital model executing on server 118 can utilize an emulator that models actual measurements and/or observations performed by sensors 108 of vehicle 102.

Exemplary System Operations

Figure 2:
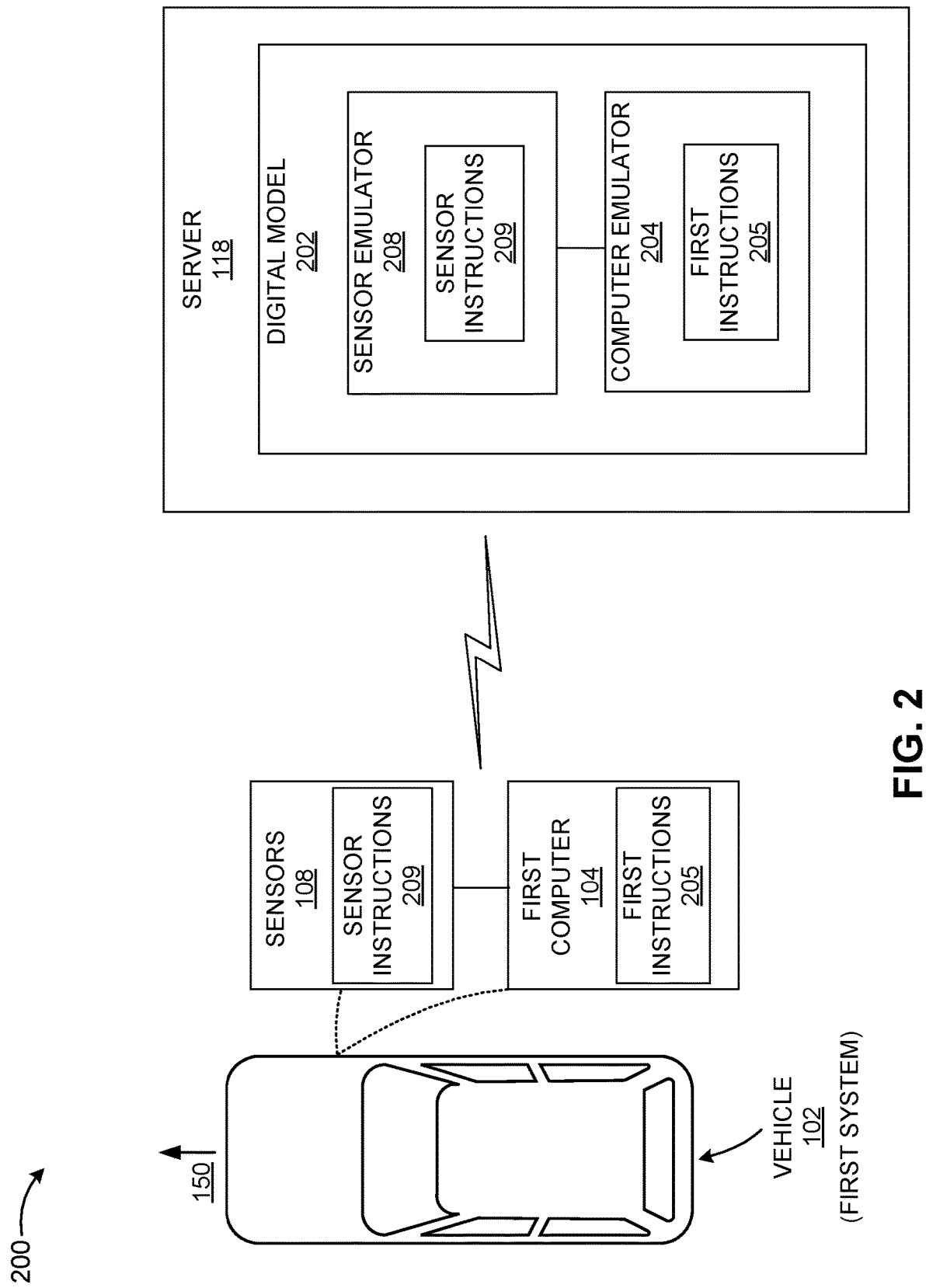
FIGS. 2-4 are block diagrams of example systems in communication with a digital model.

FIG. 2 is a block diagram of an example 200 of a vehicle in communication with a digital model. In the example of FIG. 2, vehicle 102 can travel in a forward direction along path 150. During operation of vehicle 102, sensors 108 perform a variety of operations to monitor the operational environment of vehicle 102, such as sensing speed of vehicle 102, estimating coordinates of the vehicle in a global reference frame, (e.g., via a GPS receiver), monitoring the engine and transmission of the vehicle, monitoring steering of the vehicle, etc. Sensors 108 can operate via executing sensor instructions 209, which may include signal processing, analog-to-digital conversion, controlling communications between sensors 108 and first computer 104 of the vehicle, etc. First computer 104 of vehicle 102 can operate under the direction of first instructions 205 to collect input signals from sensors 108 and to provide route planning, navigation, autonomous driving of vehicle 102.

Vehicle 102 can be in at least occasional contact with server 118, which can represent a cloud-based server remotely located with respect to vehicle 102. Server 118 can execute programming that implements digital model 202 that simulates the operation of vehicle 102. Thus, for example, digital model 202 can include sensor emulator 208, that utilizes programming instructions similar, or identical to, those of sensor instructions 209 of vehicle 102. In one example, sensor emulator 208 may emulate a signal input from any one of sensors 108, such as, for example, a thermocouple that reports an engine temperature of vehicle 102. In another example, sensor emulator 208 can emulate an output data stream from a GPS receiver on board vehicle 102. Hence, digital model 202 can include a number of sensor emulators 208, which may operate to provide realistic representations of signals that can be measured by sensors 108.

Server 118 additionally includes computer emulator 204, which can execute programming similar, or even identical to, first instructions 205 of first computer 104. For example, first instructions 205 can include programming in an assembly language, which may be utilized to communicate with hardware features of first computer 104. In another example, first instructions 205 can include programming in the C or C++ languages. In another example, first instructions 205 can include programming in SQL, which can be utilized to access and/or perform database functions to communicate with a database accessible to first computer 104. In an example, computer emulator 204 implements a virtual machine environment to emulate operation of first computer 104.

In an example, in response to detection of a degradation in the performance of one or more of sensors 108, vehicle 102 can transmit a message to server 118, which includes an indicator describing the degradation in sensor performance. In addition, vehicle 102 can transmit data describing the physical and/or operational environment of vehicle 102. Digital model 202 can then utilize the data describing the physical and/or operational environment of vehicle 102 as initial conditions to synchronize the digital model with the actual operational and physical environments of vehicle 102. Digital model 202 can then provide instructions, e.g., second instructions, to modify operations of vehicle 102 in a manner that can compensate for the degradation in the performance of one or more of sensors 108.

In an example, digital model 202 can model the behavior of vehicle 102 with an increased fidelity based on the type of sensor (e.g., one of sensors 108) that exhibits operation in a degraded mode. In this context, "fidelity" means a degree of precision in a digital model, i.e., a measurement of the degree of accuracy or closeness digital model's representation of the physical model. For example, for certain types of degradations in sensor performance, such as those that may have minimal effect on system operations, a relatively low-fidelity digital model may be utilized. However, for other types of degradations in sensor performance, such as those that could more significantly affect system operations, a relatively high-fidelity digital model may be utilized. In an example, a higher degree of fidelity in a digital model may utilized to bring about more comprehensive modeling of the operations of vehicle 102, such as by implementing a physical model of an engine of vehicle 102, modeling of additional sensor inputs, modeling coolant flow via a fluid dynamics model, etc. In an example, in response to a degradation of an engine temperature sensor of a vehicle operating in a relatively demanding physical environment that includes a relatively high ambient temperature (e.g., an outside air temperature of greater than 40° Celsius) and/or an operational environment that indicates relatively high vehicle load conditions (e.g., a fully-loaded vehicle 102), can result in server 118 utilizing a digital model that is of a higher fidelity than a digital model utilized to model vehicle 102 operating under more benign (e.g., cooler) environments. In such an example, digital model 202 can model vehicle 102 utilizing input signals of other sensors 108, such as coolant temperature sensors, transmission fluid temperature sensors, oil temperature sensors, and other secondary sensors to estimate an engine temperature of vehicle 102. Responsive to an estimated engine temperature of vehicle 102 exceeding a threshold, digital model 202 can transmit second instructions to modify a speed setting of vehicle 102.

In contrast to the above example, degradation in performance of one of four wheel-speed sensors can result in digital model 202 modeling vehicle 102 utilizing a model that is of a decreased or lower fidelity. For example, in response to detecting that a wheel-speed sensor appears to be operating in a degraded mode, server 118 can obtain input signals representing other wheel-speed sensors to determine if input signals are consistent with each other. Responsive to determining that input signals among other wheel-speed sensors, digital model 202 may transmit second instructions to vehicle 102, which can operate to substitute an input signal from a degraded wheel-speed sensor with an input signal from a different wheel-speed sensor.

Figure 3:
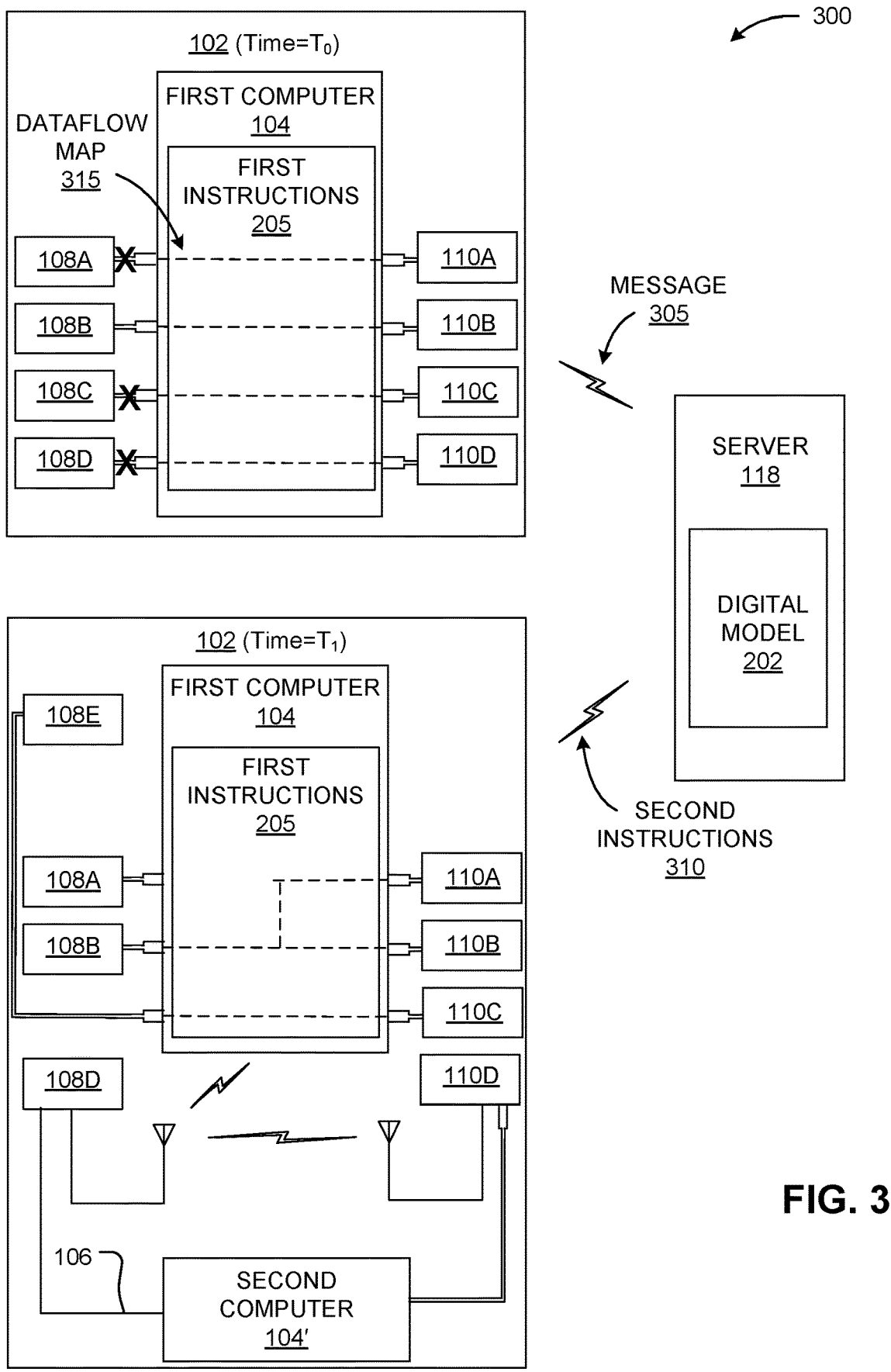

FIG. 3 is a block diagram 300 of an example vehicle in communication with a digital model at a first moment in time (time $T_0$) and at a second moment in time (time $T_1$). During an intervening period of time, e.g., between time $T_0$ and time $T_1$, digital model 202, implemented via server 118, operates to receive message 305 and transmit second instructions 310. In FIG. 3, first computer 104 of vehicle 102 (e.g., a first system) executes first instructions 205, which include processing of input signals from sensors 108A, 108B, 108C, and 108D. Sensors 108A-108D can include any of sensors 108, such as sensors that provide input signals representing measurements of the wheel speed of vehicle 102, GPS location of vehicle 102, status of the engine and transmission of vehicle 102, radar and/or LIDAR measurements, etc. Output data from sensors 108A-108D can be processed, conditioned, and/or reformatted by first instructions 205 for output in a form suitable for use by components 110A, 110B, 110C, and 110D, which may utilize such output signals to control or influence operations of vehicle 102.

In response to a degradation in the performance exhibited by one or more of sensors 108A-108D, e.g., at a time $T_0$, an indicator describing the degradation in performance can be transmitted to server 118 implementing a digital model, e.g., 202, of vehicle 102. Transmission of the indicator at time $T_0$ can describe the degradation in performance can be followed by a transmission that includes data describing an operational and/or physical environment of vehicle 102. In response to receipt of message 305 including the indicator and the data describing the operational and/or physical environment of vehicle 102, digital model 202 can replicate, e.g., in a virtual or digital domain, the state of vehicle 102. Digital model 202 can generate second instructions 310 responsive to use of a database or index that maps degradations in sensor performance with consequences in the operation of vehicle 102 based on such degradations in sensor performance. Based on such consequences, digital model 202 can then utilize programming logic to generate second instructions 310 to modify operation of vehicle 102 in a manner that reduces any negative effects on vehicle 102 that may result from the degradation and sensor performance. In turn, digital model 202 can transmit second instructions 310, which instruct first computer 104 to modify operation of vehicle 102 in a manner that can adjust the operations of vehicle 102 so that the vehicle can continue operating without being affected by the degradation in the performance of one or more of sensors 108A-108D.

In an example, sensors 108A and 108B can include wheel-speed sensors that provide input signals for use by a navigation function for display via a display component of vehicle 102, represented by component 110A. In an example that involves sensor 108C representing a GPS receiver, input signals from sensor 108C can be utilized to localize vehicle 102 on a roadway for use by an a driver assist application that may control one or more vehicle 102 components, e.g., one or more of propulsion, steering, and braking. In an example that involves sensor 108D representing an engine or other type of temperature sensor, input signals from sensor 108D can be utilized to control a coolant flow valve that operates to maintain engine temperature within a threshold value.

In the example of FIG. 3, first computer 104 can detect a degradation in operation of sensor 108A, which may exhibit intermittent communication, noisy input signals, or any other indication of a degradation in input signal quality. In an example, sensor 108A can represent one of four wheel-speed sensors of vehicle 102. In response to first computer 104 detecting the degradation in operation of sensor 108A, first computer 104 can generate e.g., at time $T_0$, a message that includes an indicator describing the degradation of sensor 108A for transmission to server 118 executing programming that implements digital model 202. First computer 104 may additionally generate data describing an operational and/or physical environment of vehicle 102. Data describing an operational environment of vehicle 102 can include measured operational aspects of vehicle 102, such as vehicle speed settings, vehicle towing parameters, vehicle braking parameters and/or status of vehicle braking components, engine torque output, engine/transmission and/or gearbox temperatures, battery temperatures, a temperature of an electric motor of the vehicle, a condition of one or more circuit breakers of the vehicle, a condition of one or more vehicle wiring harnesses, etc. Data describing a physical environment of vehicle 102 can include parameters related to the incline or gradient of a road or other type of path on which the vehicle is proceeding, an ambient temperature, etc.

Responsive to receipt of data in message 305 describing the operational and/or physical environment of vehicle 102, digital model 202 can transmit second instructions 310 to vehicle 102. Second instructions 310 can instruct first computer 104, for example, to avoid use of input signals from sensor 108A and to substitute such input signals with signals from a suitably functioning different wheel-speed sensor, e.g. wheel-speed sensor 108B. Accordingly, in this example, second instructions 310 operate to instruct first computer 104 to modify dataflow map 315, e.g., at time $T_1$, between input ports and output ports of first computer 104 in a manner that compensates for degraded operation of sensor 108A.

Also in the example of FIG. 3, first computer 104 can detect degradation in operation of sensor 108C, e.g., intermittent communication, noisy input signals, an increase in bit-error-rate of input signals, etc. In an example, sensor 108C can represent a GPS receiver that assists in locating vehicle 102 on a digital map. In response to computer 104 detecting the degradation in operation of sensor 108C, first computer 104 can generate a message, e.g., at time $T_0$, that includes an indicator describing the degradation of sensor 108C for transmission to server 118. First computer 104 may additionally generate data describing an operational and/or physical environment of vehicle 102. Responsive to receipt of message 305 including the indicator describing the degradation of sensor 108C and data describing the operational and/or physical environment of vehicle 102, digital model 202 can instruct first computer 104 to substitute input signals from sensor 108C. For example, in response to sensor 108C including a GPS receiver exhibiting intermittent communication with first computer 104, digital model 202 can instruct first computer 104 to substitute input signals from sensor 108C with input signals from an inertial measurement unit, e.g., sensor 108E. Accordingly, in this example, second instructions 310 operate to instruct first computer 104 to substitute, e.g., at time $T_1$, input signals from a GPS receiver with signals from a potentially decreased-accuracy signal source, such from as an inertial measurement unit, e.g., sensor 108E.

Also in the example of FIG. 3, first computer 104 detects degradation in operation of sensor 108D, e.g., intermittent communication over a wired communication medium, noisy input signals, etc. In an example, sensor 108D can represent an engine temperature sensor that operates as an input signal to control coolant flow, e.g., utilizing component 110D, from a radiator of vehicle 102. In response to first computer 104 detecting the degradation in operation of sensor 108D, first computer 104 can generate, e.g., at time $T_0$, message 305 that includes an indicator describing the degradation of sensor 108C for transmission to server 118. First computer 104 can additionally generate data describing an operational and/or physical environment of vehicle 102. Responsive to receipt of the indicator describing the degradation of sensor 108D, and/or data describing the operational and/or physical environment of vehicle 102, digital model 202 can instruct first computer 104 to communicate wirelessly e.g., utilizing a Bluetooth communication protocol. In an example, e.g., at time $T_1$, sensor 108D can be directed to communicate wirelessly directly with component 110D and/or can be directed to communicate wirelessly with first computer 104, e.g., via communications component 114 of FIG. 1.

Alternatively, in response to first computer 104 detecting degradation in operation of sensor 108D, first computer 104 can migrate processing of input signals from sensor 108D to second computer 104'. Second computer 104' can be any suitable type of additional computing resource onboard vehicle 102. Thus, second computer 104', can be a computing resource normally engaged in image processing and/or object detection, infotainment, navigation, driver assistance, etc. Thus, in an example, in response to first computer 104 detecting noisy or intermittent input signals from sensor 108D, first computer 104 may instruct sensor 108D to utilize a second communication medium, such as vehicle network 106, to communicate with second computer 104', utilizing processing capacity of second computer 104'. Thus, second computer 104' may then be redirected to suspend normal processing operations, such as operations to perform image processing and/or object detection, infotainment, navigation, etc., and to implement programming to perform optimal filtering, e.g., utilizing an additive filter, a Kalman filter, a particle filter, etc., to provide an estimate of data values transmitted by sensor 108D.

Thus, as described in relation to FIG. 3, in response to an indication that one or more of sensors 108, e.g., 108A, 108B, 108C, and/or 108D has experienced a degradation in performance, second instructions 310 can direct first computer 104 of vehicle 102 to operate in a manner that compensates for the degradation in sensor performance. Such compensation can include substitution of input data from a first sensor to a second sensor, substitution of input data from a first sensor to a second sensor having decreased accuracy with respect to the first sensor, instructions to direct communications from a wired medium to a wireless medium, reconfiguration of dataflow map 315 of first computer 104, processing of input signals data by second computer 104', etc.

Figure 4:
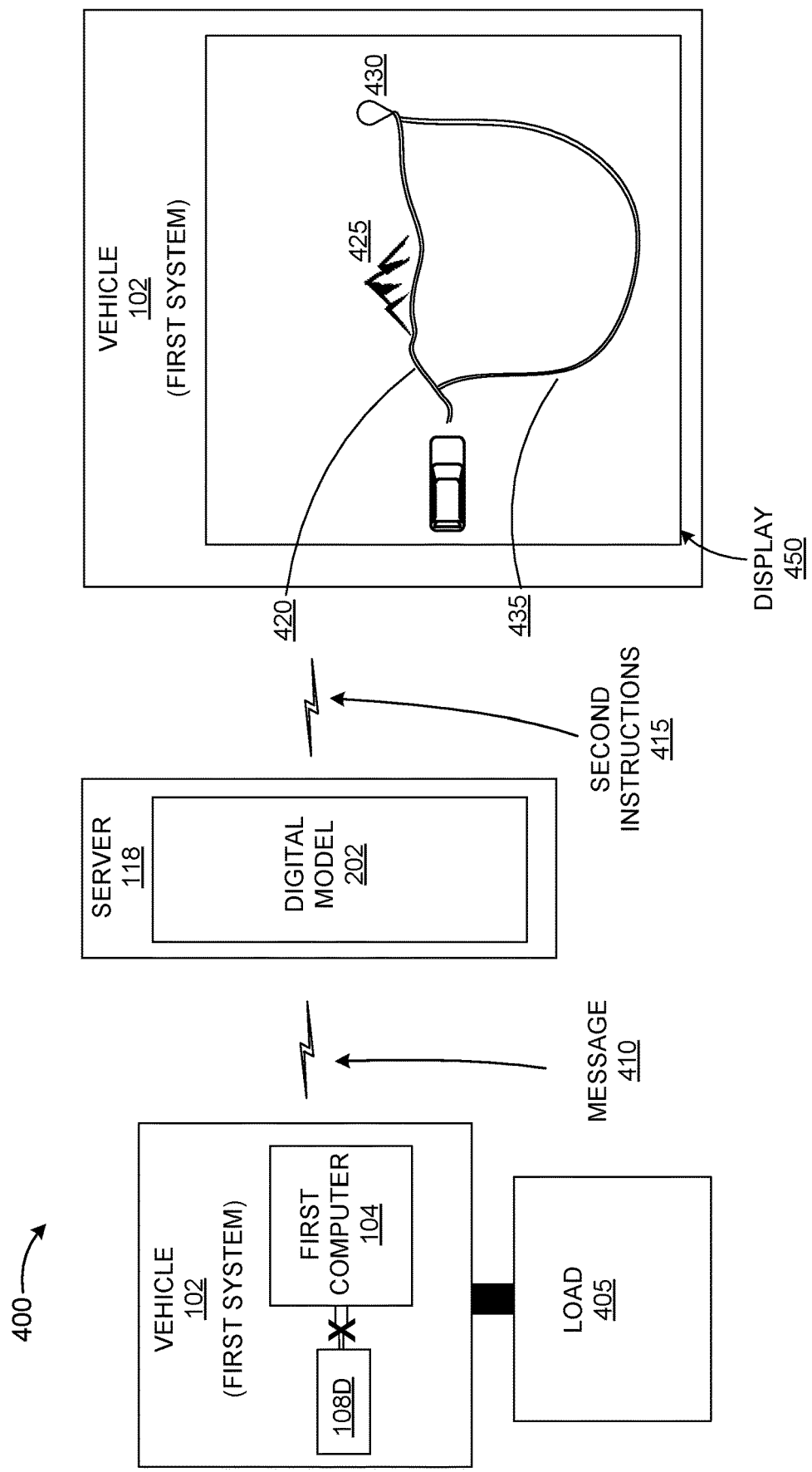

FIG. 4 is a block diagram of an example 400 vehicle in communication with a digital model. In FIG. 4, sensor 108D can correspond to an engine temperature sensor, for example, which operates to provide output signals to first computer 104. First computer 104 can utilize input signals from sensor 108D for any purpose, such as to control a valve that permits coolant to flow to the engine of vehicle 102. In the example of FIG. 4, first computer 104 may detect a degradation in the performance of sensor 108D. Such degradation may include, for example, sensor 108D intermittently transmitting engine temperatures, presence of noise on input signal lines, e.g., beyond a threshold level, etc. In response to server 118 detecting a degradation in performance of sensor 108D, vehicle 102 can transmit an indicator to first computer 104 followed by data describing the operational and/or physical environment in which vehicle 102 currently operates. In the example of FIG. 4, vehicle 102 can additionally transmit a planned route to destination 430 to server 118.

In the example of FIG. 4, vehicle 102 is shown as transporting load 405, which can include a camper, trailer, or other mass, which places a level of stress on the propulsion, e.g., engine and powertrain, of vehicle 102 that may be higher than typically expected (e.g., higher than without load 405). Accordingly, in this example, an operational environment of vehicle 102 can be characterized as being particularly demanding. Alternatively, or in addition, vehicle 102 can be operating, or be planned to operate in, the physical environment that includes a relatively steep positive inclination or gradient in the planned route of vehicle 102. In this example, vehicle 102 may transmit data that describe an demanding operational and physical environment.

In response to receipt of an indicator describing the degradation in performance of sensor 108D and data describing the operational and/or physical environment of vehicle 102 e.g., message 410 on FIG. 4, digital model 202 executing on server 118 can simulate operations of the vehicle in a virtual or digital domain. Simulating of the operations of vehicle 102 may include digital model 202 predicting an operational and/or physical environment of vehicle 102 at a future time, such as a time at which vehicle 102 is planned to transport load 405 through mountainous terrain 425 as depicted on display 450. In response to digital model 202 simulating operations of vehicle 102, accounting for sensor 108D performing in a degraded mode of operation, can instruct, e.g., via second instructions 415, for vehicle 102 to actuate a display showing a travel path that is different from a previous travel route, such as from planned route 420 to re-planned route 435. Second instructions 415 can instruct vehicle 102 to actuate other components of the vehicle two, such as actuating brakes, actuating steering, etc. The physical environment of re-planned route 435 may represent a route that avoids mountainous terrain along planned route 420, thereby reducing stress on the operational environment of vehicle 102.

Alternatively, or in addition, digital model 202 can instruct vehicle 102 e.g., via second instructions 415, to reroute travel along re-planned route 435, thereby avoiding planned route 420, which may correspond to a path that can be subjected to certain types of weather. Such weather can include weather, e.g. inclement weather that includes snow, ice, temperatures less than a threshold value (such as 0° Celsius), etc. In another example, digital model 202 can reroute vehicle 102 to travel on a path that avoids other types of weather, such as travel that could subject vehicle 102 to relatively high ambient temperatures, such as temperatures greater than 40° Celsius. Alternatively, or in addition, digital model 202 may instruct vehicle 102 to actuate propulsion of the vehicle so as to operate the vehicle at a decreased speed, such as 80 kilometers per hour, 90 kilometers per hour, etc.

Figure 5:
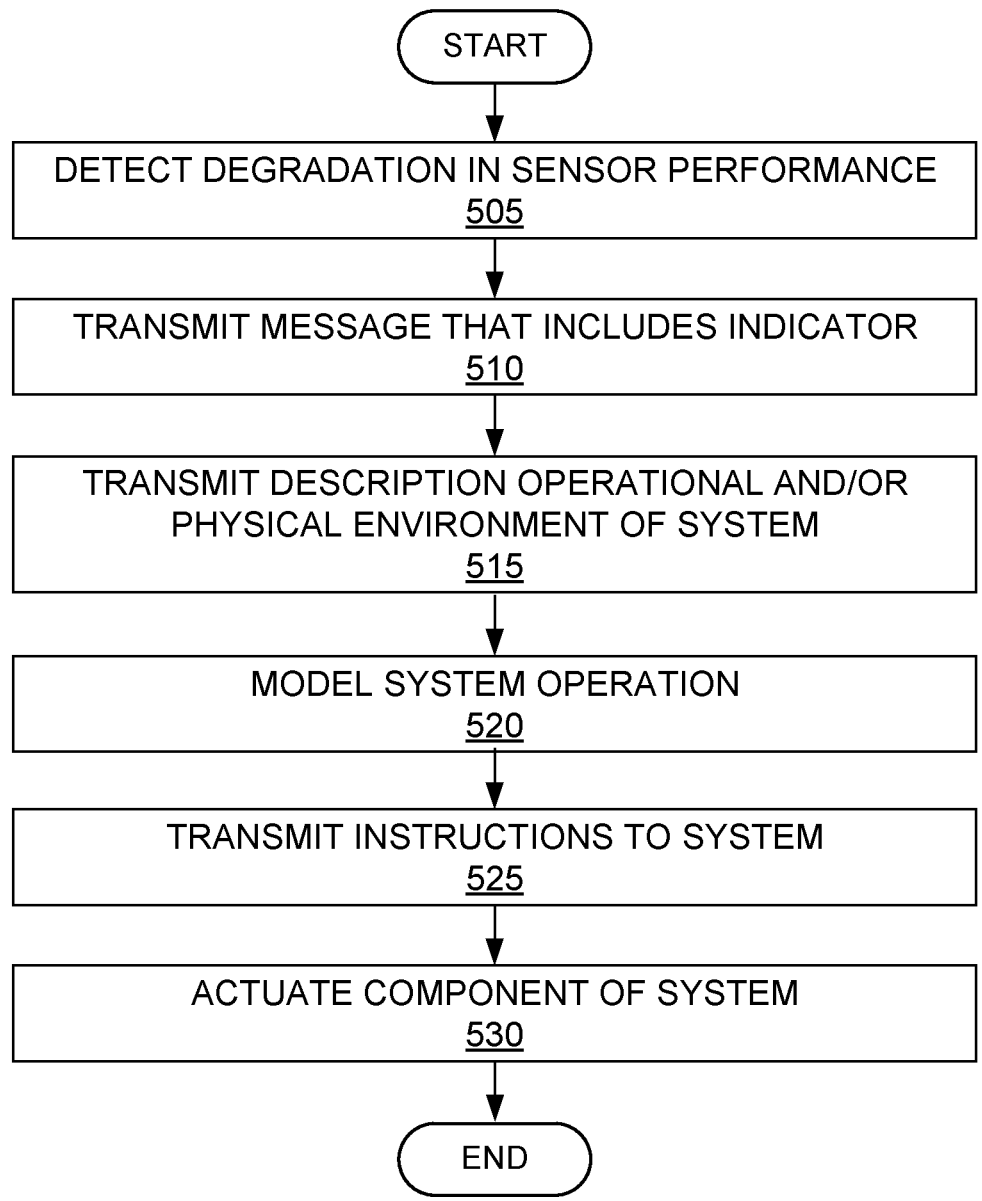
FIG. 5 is a process flow diagram of an example process for real-time digital modeling of a system.

FIG. 5 is a process flow diagram of an example process for real-time digital modeling of a system. In an example, the memory of first computer 104 stores executable instructions for performing the steps of process 500, and/or such programming could be implemented in other computing devices, some other non-system computer, and/or other computing devices of the first system, e.g., vehicle 102, such as utilizing spare processing capacity of second computer 104' of FIG. 3. Further, example process 500 can be utilized to provide digital modeling of a first system, e.g., vehicle 102, in which the first system transmits an indicator to digital model 202, e.g., executing on server 118, describing performance degradation of a sensor 108 and describing data describing the operational and/or physical environment of the first system, e.g., vehicle 102. In turn, digital model 202 can utilize programming instructions that are similar, or even identical to, programming instructions executable on first computer 104. Digital model 202 can include sensor emulators, which simulate behavior exhibited by sensors of the first system, e.g., vehicle 102. Responsive to digital model 202 receiving the data describing the operational and/or physical environment of the first system, digital model 202 can transmit second instructions to the first system, e.g., vehicle 102, which can instruct the first system to modify operation of the system in a manner that compensates for the degradation in sensor performance so that the first system can continue operating. Compensation for the degradation in sensor performance can include derating system operations, such as instructing the system be operated at a decreased speed. In other examples, compensation for the degradation in sensor performance can include digital model 202 instructing the substitution of an input signal from a degraded sensor with an input signal from a different sensor. The different sensor may include a sensor having decreased accuracy than sensor 108 prior to sensor 108 exhibiting degraded performance. In yet other examples, compensation for the degradation in sensor performance can include a digital model instructing first computer 104 to remap input/output ports of the first computer, so as to preclude a system component from utilizing data from the degraded sensor. In another example, responsive to a degradation in the capability for a sensor to communicate via a wired medium, a digital model can instruct a sensor to communicate via a wireless channel. In another example, digital model 202 may instruct the first system, e.g., vehicle 102, to operate in a physical environment that represents a more benign physical environment, such as by rerouting the first system, e.g., vehicle 102.

Process 500 begins at block 505, at which first computer 104 detects degradation in performance of one or more of sensors 108. Degradation in performance of one of sensors 108 may include delayed or intermittent communication with the sensor, an increase in bit-error-rate of input data from sensor 108, accuracy and/or error estimations of data transmitted from sensor 108 being above a threshold, etc.

Process 500 may continue at block 510, which can include the system, e.g., vehicle 102, transmitting a message, which includes an indicator that describes the exhibited degradation of sensor performance, to server 118. The indicator may include whether the degraded sensor communicates intermittently with first computer 104 and/or components 110, delays in receiving input data from the degraded sensor performance etc.

Process 500 may continue at block 515, at which the system, e.g., vehicle 102, transmits data describing the operational and/or physical environment of the system to digital model 202. Data describing the operational environment of the system, e.g., vehicle 102, can include vehicle speed settings, vehicle towing parameters, vehicle braking parameters, engine torque output, engine and transmission temperatures, battery temperatures, vehicle steering parameters, etc. Data describing the physical environment of the system, e.g., vehicle 102 can include outside air temperature, humidity, and weather conditions (e.g., rain, snow, etc.), parameters related to the inclination or gradient of a road or other type of route by which the vehicle is proceeding, a particular ambient temperature, surface roughness of a planned route (e.g., on road travel, off-road travel, etc). Transmitting of data can include modulating a radiofrequency signal via communications component 114 of FIG. 1 to a Wi-Fi® access point, a cellular infrastructure, etc.

Process 500 may continue at block 520, at which server 118, implementing digital model 202, receives the indicator describing the exhibited degradation in sensor performance. Block 520 may additionally include server 118 receiving data describing the operational and/or physical environment of the first system, e.g., vehicle 102. Digital model 202 can then simulate, or even replicate, operations of the first system, e.g., vehicle 102, utilizing the data describing the operational and/or physical environment of the first system as initial conditions from which digital model 202 simulates operations of the first system. Digital model 202 can utilize a sensor emulator to emulate parameters of the sensor exhibiting degraded performance. Emulation of sensors, e.g., sensors 108A-108D, can include simulating, or even replicating, signal timing parameters, waveforms of input signals from the sensor exhibiting degraded performance, interactions between programming steps and hardware and/or firmware resources accessible to the degraded sensor, etc.

Digital model 202 can execute programming instructions that are similar, or even identical, to programming executing via first computer 104.

Process 500 may continue at block 525, at which digital model 202, via server 118, can transmit second instructions, e.g., 310, 415, to the first system, e.g., vehicle 102, instructing the first system to modify operation(s) in a manner that compensates for the degradation in sensor performance so that the first system can continue operating. Compensation for the degradation in sensor performance can include derating system operations, such as instructing that the system, e.g., vehicle 102, be operated at a decreased speed. In other examples, compensation for degradation in sensor performance can include second instructions, e.g., 310, 415, that instruct the substitution of an input signal from a degraded sensor, e.g., sensor 108C of FIG. 3, with an input signal from a different sensor, e.g., sensor 108E of FIG. 3. The different sensor, e.g., sensor 108E, can include a sensor having a decreased accuracy than the degraded sensor, e.g., sensor 108C, prior to the sensor exhibiting degraded performance. In other examples, compensation for the degradation in sensor performance can include a digital model instructing a first computer, e.g., first computer 104, to remap dataflow, e.g., dataflow map 315 of FIG. 3, between input/output ports of first computer 104, so as to preclude a component, e.g., component 110A, of the first system from utilizing data from the degraded sensor. In another example, responsive to a degradation in the capability for a sensor, e.g., sensor 108D, to communicate via a wired medium, a digital model can instruct the sensor communicate via a wireless channel. In another example, digital model 202 may instruct the first system to operate in a physical environment.

Process 500 may continue at block 530, at which the first system, e.g., vehicle 102, actuates a component responsive to receiving second instructions, e.g., 310, 415. Actuation of the component can include modifying propulsion parameters of the first, e.g., vehicle 102, so as to reduce a speed setting of the vehicle. Alternatively, or in addition to, actuation of the component can include displaying, e.g., via display 450, a proposed different route, e.g., re-planned route 435, which may permit the first system, e.g., vehicle 102, to operate in a more benign operational and/or physical environment.

After block 530, process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An apparatus comprising:
a first computer including a processor coupled to a memory, the memory including first instructions executable by the processor to:
transmit a message, responsive to receipt of an indicator from a first sensor of a first system, to an input of a digital model of the first system, the message including data describing the indicator and data describing an operational environment and a physical environment of the first system;
receive, responsive to the digital model executing programming of the first system, second instructions to modify an operation of the first system based on the described operational and physical environments; and
actuate a display to display a re-planned route of the first system based on a planned route of the first system and the second instructions.

2. The apparatus of claim 1, wherein the first system includes a system of a vehicle, and wherein the second instructions to modify the operation of the first system include further instructions to:
actuate propulsion of the vehicle;
actuate braking of the vehicle;
actuate steering of the vehicle; and/or
actuate the display to display potential modifications to the operational or physical environment of the first system.

3. The apparatus of claim 1, wherein the first system includes a system of a vehicle, and wherein the first instructions further include instructions to:
transmit the planned route of the vehicle; and
receive, in response to receipt of the planned route by the digital model, the re-planned route of the vehicle for travel in a different physical environment.

4. The apparatus of claim 1, wherein the indicator from the first sensor indicates degraded performance of the first sensor.

5. The apparatus of claim 1, wherein the indicator from the first sensor indicates degraded performance of the first sensor and wherein the second instructions to modify the operation of the first system include instructions to substitute an input signal from the first sensor by a second sensor.

6. The apparatus of claim 1, wherein the indicator from the first sensor indicates degraded performance of the first sensor and wherein the second instructions to modify the operation of the first system include instructions to substitute an input signal from the first sensor by a second sensor, the second sensor having decreased accuracy with respect to the first sensor.

7. The apparatus of claim 1, wherein the indicator from the first sensor indicates a degraded communications capability of the first sensor and wherein the second instructions to modify the operation of the first system include instructions for the first system to communicate with the first sensor via a wireless channel.

8. The apparatus of claim 1, wherein the indicator from the first sensor indicates a degraded communications capability of the first sensor, and wherein the second instructions to modify the operation of the first system include instructions to reconfigure a dataflow map of the first computer of the first system.

9. The apparatus of claim 1, wherein the indicator from the first sensor indicates a degraded communications capability of the first sensor, and wherein the second instructions to modify the operation of the first system include instructions to perform a function via a second computer of the first system.

10. The apparatus of claim 1, wherein the first system includes a vehicle system that includes an energy storage component, a propulsion component, a braking component, a suspension component, a steering component, or a transmission component.

11. An apparatus comprising:
a computer including a processor coupled to a memory, the memory including first instructions executable by the processor to:
receive a message, responsive to receipt of an indicator from a first sensor of a first system, for input to a first digital model of the first system, the message including data describing the indicator and data describing an operational environment and a physical environment of the first system;
apply the indicator from the first sensor to a digital model executing programming of the first system; and
transmit second instructions to change an operation of the first system based on the described operational and physical environments; and
actuate, at the first system and based on the second instructions, a propulsion actuator, a braking actuator, a steering actuator, and/or a display.

12. The apparatus of claim 11, wherein the first instructions further include instructions to apply the described operational and physical environments to the digital model of the first system, and wherein the second instructions include instructions to operate the first system in a derated mode.

13. The apparatus of claim 11, wherein the first instructions further include instructions to apply a second digital model of the first system responsive to determination that the described physical environment meets a threshold condition of inclement weather.

14. The apparatus of claim 11, wherein the first system includes a system of a vehicle, and wherein the second instructions further include instructions to:
receive a planned route of the vehicle; and
transmit a re-planned route of the vehicle for travel in a different physical environment.

15. The apparatus of claim 11, wherein the indicator from the first sensor indicates degraded performance of the first sensor and wherein the second instructions to modify operation of the first system include instructions to substitute an input signal from the first sensor by a second sensor.

16. The apparatus of claim 11, wherein the indicator from the first sensor indicates degraded performance of the first sensor and wherein the second instructions to modify the operation of the first system include instructions to substitute an input signal from the first sensor by a second sensor, the second sensor having decreased accuracy with respect to the first sensor.

17. The apparatus of claim 11, wherein the indicator from the first sensor indicates a degraded communications capability of the first sensor and wherein the second instructions to modify the operation of the first system include instructions for the first system to communicate with the first sensor via a wireless channel.

18. The apparatus of claim 11, wherein the indicator from the first sensor indicates a degraded communications capability of the first sensor, and wherein the second instructions to modify the operation of the first system include instructions to reconfigure a dataflow map of data from the first sensor to the first system.

19. The apparatus of claim 11, wherein the indicator from the first sensor indicates a degraded communications capability of the first sensor, and wherein the second instructions to modify the operation of the first system include instructions to perform a function utilizing a second computer of the first system.

20. The apparatus of claim 11, wherein the first system includes a vehicle system that includes an energy storage component, a propulsion component, a braking component, a suspension component, a steering component, or a transmission component.

* * * * *